(12) United States Patent
Barziza

(10) Patent No.: US 7,753,350 B2
(45) Date of Patent: Jul. 13, 2010

(54) T-SLOT BLOCK MODULES FOR MILLING MACHINES AND METHOD OF USE

(76) Inventor: Samuel W. Barziza, 1 Robin Hood La., Conroe, TX (US) 77301

( * ) Notice: Subject to any disclaimer, the term of this patent is extended or adjusted under 35 U.S.C. 154(b) by 0 days.

(21) Appl. No.: 11/868,887

(22) Filed: Oct. 8, 2007

(65) Prior Publication Data

US 2008/0084017 A1    Apr. 10, 2008

Related U.S. Application Data

(60) Provisional application No. 60/828,670, filed on Oct. 9, 2006.

(51) Int. Cl.
*B23Q 3/06* (2006.01)
(52) U.S. Cl. .............................. 269/99; 269/60; 269/100
(58) Field of Classification Search .................. 269/99, 269/95, 282, 93, 235, 88, 60, 100
See application file for complete search history.

(56) References Cited

U.S. PATENT DOCUMENTS

| 3,967,816 | A | | 7/1976 | Ramsperger et al. |
| 4,445,678 | A | | 5/1984 | George |
| 5,060,920 | A | * | 10/1991 | Engibarov .................. 269/282 |
| 5,192,145 | A | | 3/1993 | Rixen et al. |
| 5,481,842 | A | * | 1/1996 | Gautreau .................... 52/656.9 |
| 5,501,437 | A | | 3/1996 | Kisslig |
| 5,551,795 | A | * | 9/1996 | Engibarov .................. 403/381 |
| 5,695,178 | A | * | 12/1997 | Lenzkes ....................... 269/99 |
| 5,746,535 | A | * | 5/1998 | Kohler ....................... 403/258 |
| 5,931,726 | A | | 8/1999 | Peters |
| 6,158,728 | A | | 12/2000 | Smith |
| 6,273,635 | B1 | * | 8/2001 | Swanson .................... 403/299 |
| 6,712,543 | B1 | * | 3/2004 | Schmalzhofer ............. 403/381 |
| 2008/0084017 | A1 | * | 4/2008 | Barziza ....................... 269/60 |

OTHER PUBLICATIONS

DeGarmo, et al; Materials and Processes in Manufacturing, 7th Edition, 1988, pp. 750-752, Macmillan Publishing Co., New York.

* cited by examiner

*Primary Examiner*—Lee D Wilson
(74) *Attorney, Agent, or Firm*—David B. Dickinson

(57) ABSTRACT

The present invention is a T-Slot block assembly that provides a plurality of attachment points for attachment to a milling machine worktable and to other T-Slot blocks for accommodating a variety of differing clamping or work piece holding jobs. Furthermore said invention can utilize common available clamps, fasteners, step blocks, T-nuts and various common but numerous work holding tooling. No additional mounting plates, or any type of preparatory hardware is required to directly mount the T-Slot Block onto the milling table or other work table where a T-slot is provided.

11 Claims, 15 Drawing Sheets

T-SLOT BLOCK MODULES FOR MILLING MACHINES AND METHOD OF USE

Applicant hereby adopts by reference and claims priority to his provisional application Ser. No. 60/828,670 filed Oct. 9, 2006.

BACKGROUND OF THE INVENTION

This present invention relates to machine tool accessories and more specifically to a T-slot accessory work holder specifically for milling machines. The construction of typical milling machines (specifically the types used in metal fabrication shops and machine shops) provides a long planar table to hold a work piece below a milling spindle.

A milling machine table is a large planar surface on which metal blocks are attached permitting metal removal from work pieces held on the milling machine table surface. Drilling, boring, metal profiling and various other metal removal tasks are performed thereon. The machine table is generally rectangular in shape, although special tables may be fabricated that are round or square. One obvious feature of the machine table is a very simple feature, T-Slots. The T-Slots are specially shaped channels that run along the length of the machine table. The T-Slots affords the machinist user with the limited ability to attach vises and other work holding devises. Special work holding tools such as T-Nuts, Step Blocks, and Threaded Rods are used to securely clamp the work piece and attaching device to the planar surface.

T-Slots have long been found in machine tool assemblies. No known multiple T-slot assembly permitting a variety of positions to be formed for clamping or holding a work piece on a milling machine table and for which no preparatory mounting of affixing hardware is required are known to applicant. For a recent description of the state of this art, see U.S. Pat. No. 6,158,728 to Smith, issued Dec. 12, 2000.

Most machine tables have three or four T-Slots in them. T-Slots are even more useful on the larger machine tables. The T-Slots incorporated in existing machine tables are fixed and unmovable, and typically run in only one direction, thereby limiting the work holding strategy. There is a plethora of vises, predrilled fixing plates, angle plates, and also various clamps, tightening screws, nuts, bolts, springs, pins, and even pallets that mimic the basic features of the machine table, and these pallets can be typically changed out, but require preparatory mounting hardware to mount to the machine table and also require time and energy to unbolt, remove and rearrange the work piece for additional desired work. In order to accommodate the wide variety of milling jobs that a shop may be asked to perform, the machine shop retains an inventory of numerous expensive clamps and various other work holding equipment. For instance using modular fixing plates and the necessary clamps, riser blocks and various assortments of screws, nuts, and positioning blocks are very expensive. Setup time for attaching these fixing plates to the planar surface can be quite lengthy thereby resulting in lost time for actual machining operations, and consequent loss of revenue.

A new accessory has been invented to afford the machine shop more options in work holding. This new device is designed to mount directly on the milling machine table without the need for any sort of preparatory devices or hardware. This new accessory is called a T-Slot Block. The T-Slot Block features a T-Slot, just like the milling machine's table, and it also has tabs that extend outward from the base of the T-Slot Block. These tabs are called keys. These tabs or keys are designed to mount the T-Slot Block quickly and accurately in the machine table's T-Slot.

The T-slots in the T-Slot Block run perpendicular to the direction of the tabs or keys. Thus the T-slots in the T-Slot Block run perpendicular to the milling machine's T-slots.

The T-Slot Block is manufactured from a single piece of aluminum, or steel. Other materials, well known to those designing and constructing machine tool accessories may be substituted without departing from the spirit or intent of this application. Secondary machining operations can be performed on the T-Slot Blocks such as precision grinding, and heat hardening, depending on the precision of measure a customer might require. Manufacturing the T-Slot Block out of aluminum allows the customer an inexpensive unit, and it also allows the customer to perform specialized fixing since the T-Slot Block can be cut to conform to odd or unusual shape for parts that must be held. The T-Slot Block can be offered in various lengths, widths, and heights. The T-Slot Block can be fabricated with many predrilled and tapped holes or, alternatively, with no drilled and tapped holes. Furthermore, the T-Slot Block can have one or more tabs on the base of the T-Slot Block or anywhere on the T-Slot Block. The T-Slot Block can additionally provide removable tabs to allow total flexibility in the use of the T-Slot Block. Additionally multiple T-Slots can be offered, on the top, or sides, of the T-Slot Block and some T-Slots may be perpendicular or parallel or both on the T-Slot Block body. The general shape of the T-Slot Block is rectangular or cubical in appearance, but some can be triangular or angular or round. Furthermore, a custom T-Slot Block can be offered in which a T-Slot has been left off of the block, so that a customer can mill his T-Slot at a location on the block that accomplishes a job required by the machinist or the machinist can mill custom shapes to fit the profile of the part.

SUMMARY OF THE INVENTION

The present embodiment of the invention relates to an apparatus for clamping a work piece to a milling planar table and providing a body having a tab formed on a lower surface of said body from one lateral edge to an opposing lateral edge to engage a groove in a table; one or more T-shaped grooves formed in an upper surface of said body perpendicular to the tab; and a passage formed from the upper surface of the body through the lower surface of the body to permit attachment to said table. The apparatus can also provide a second body attached to said first body's T-slot groove providing a passage formed in said second body permitting affixation of said second body to the first body, said second body providing further T-slot grooves for engaging one or more T-slots to thereby permit the combination of said apparatus to be used for attaching oddly shaped work pieces to the planar surface of the milling tool. This application also describes a method for clamping a work piece to a machining table by attaching at least one body providing a tab on a lower surface in a machine table slot; attaching at least one cooperating work piece in a T-shaped groove on an upper surface of said body; and, affixing said body and cooperating work piece to the machining table by inserting a pin, bolt, or fastener in a passage through said body and machining table.

An apparatus for clamping a work piece to a table comprising a body having a tab formed on a lower surface of said body from one lateral edge to an opposing lateral edge to engage a groove in a table; a T-shaped groove formed in an upper surface of said body to the tab; and, a passage formed from the upper surface of the body through the lower surface of the body to permit attachment to said table.

The apparatus can further provide a second body attached to said first body T-slot groove, said second body providing further T-slot grooves for engaging one or more T-slots. The T-shaped groove formed in the upper surface of the body can be perpendicular to the grooves of the table or acutely angled to the grooves of the table. The tab formed in the lower surface of the body can be perpendicular to the grooves of the table or acutely angled to the grooves of the table.

The apparatus can be formed with one or more tabs and a tab grooves on any lateral edge of the body. The apparatus can provide that any passage through the body is threaded permitting attachment of threaded bolts and clamps to said body.

The upper surface of the body can be planar and without any grooving and each lateral edge or surface or face has one or more T-slot grooves to permit any specially shaped work pieces to be attached to the body. Moreover, the body of the T-Slot Block body can provide a T-slot to slideably engage a T-slide assembly.

DETAILED DESCRIPTION OF THE PREFERRED EMBODIMENTS

Figure 1:
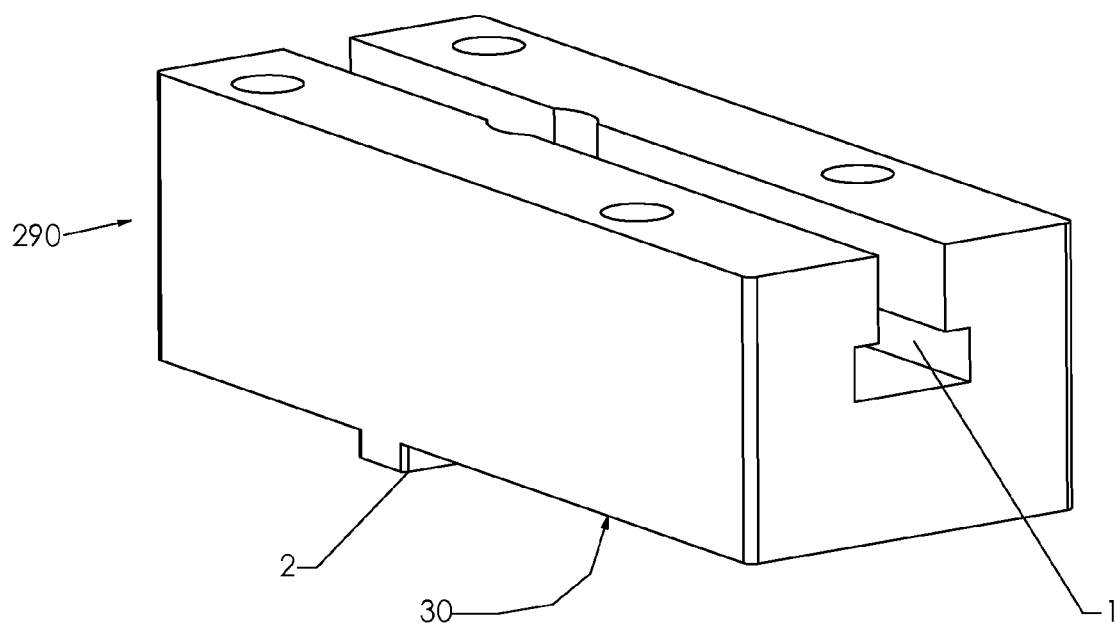
FIG. 1 is a perspective view of a standard T-Slot Block.
Figure 2:
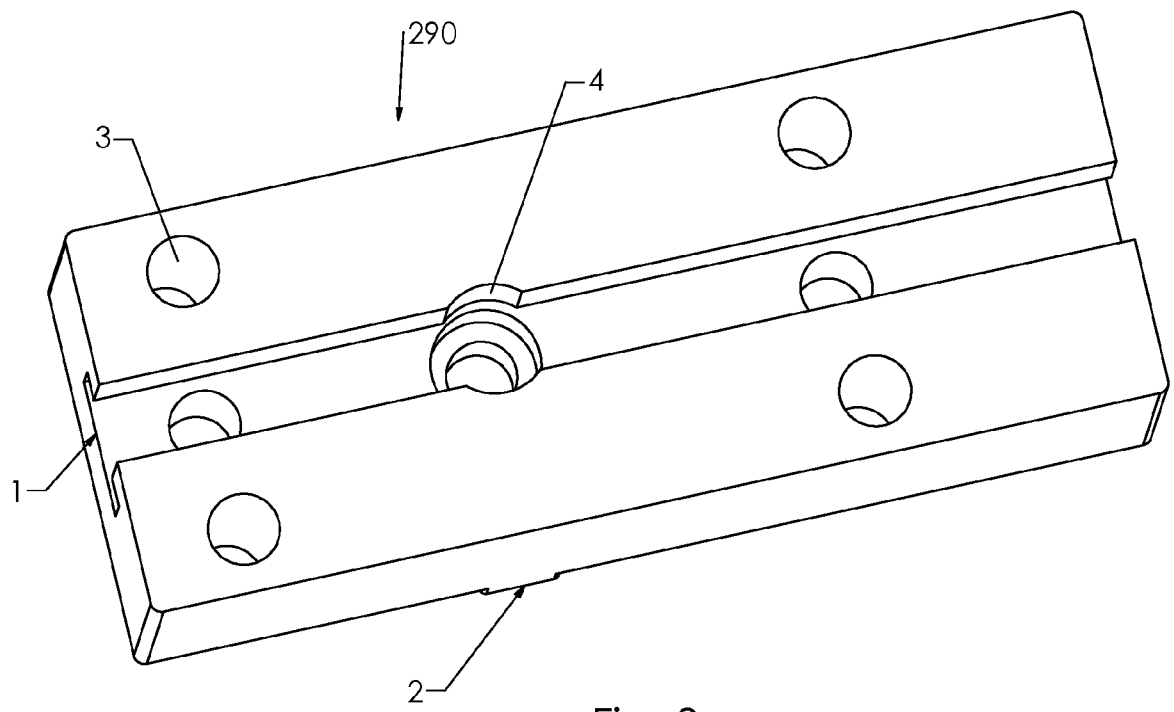
FIG. 2 is a top perspective view of the same block shown in FIG. 1.

The T-Slot Block has tabs or built in location keys for the mill table's T-slot. These keys or tabs permit the user machinist to quickly mount the T-Slot Block onto the machine table. Currently there are four T-Slot Block standard product lines. Each line corresponds to a T-slot size. The product lines include ½", 9/16", 5/8" and ¾" size T-Slots; consequently the tabs on the T-Slot Block can match the T-slot on the mill table. Corresponding to T-Slot Block line, the T-slot in the T-Slot Block matches the machine tool table. For example if a shop has mills that have 9/16 inch size T-Slots on their mills, they would order the T-Slot Block or accessories for the 9/16 inch line. Thereafter, all of the existing T-Slot tooling, clamps, bolts, studs, straps, edge clamps on hand at the machine shop, would fit the T-Slot Block. In FIG. 1, a T-Slot Block, providing a 'T' slot 2 tab or key on a lower surface 30 for installing the block on a machine table, not shown, and providing a T-slot 1. In FIG. 2, tapped holes 3 permit additional clamps to be utilized to affix the T-Slot Block to the planar surface of the milling table. Counter-bore passage 4 also made through the T-Slot Block permits attachment to the milling table in a manner well known in this art. This bolt passage affixing the T-Slot Block onto the machine tool's table allows the T-Slot Block to be held in a fixed position on the milling table while the work piece manipulated without movement of the underlying T-Slot Block.

Figure 3:
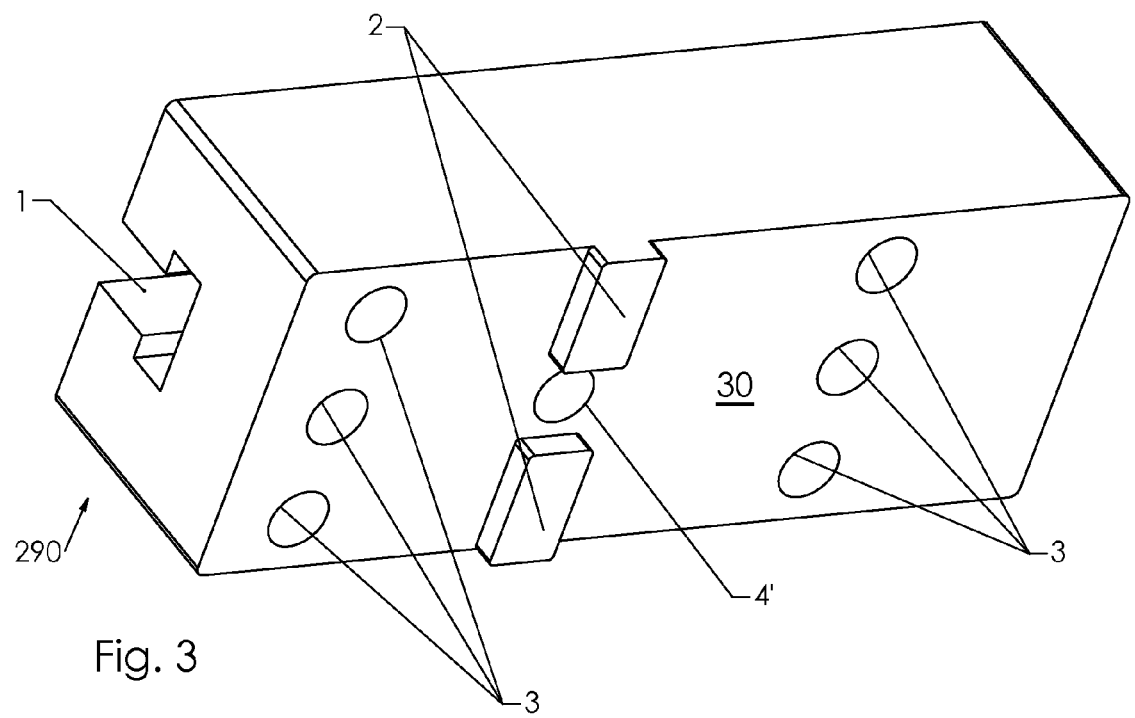
FIG. 3 is bottom perspective view of the Standard T-Slot Block of FIG. 1.

In FIG. 3, locating tab 2 for installing the T-Slot Block onto the machine tool's table hold the T-Slot Block in fixed relationship with the milling table. This tab 2 also insures a precise location perpendicular to the machine tool table T-slot 1. The tapped holes 3 formed through the T-Slot Block allow the attachment of fasteners or other components to the T-Slot Block for added functionality.

Figure 4:
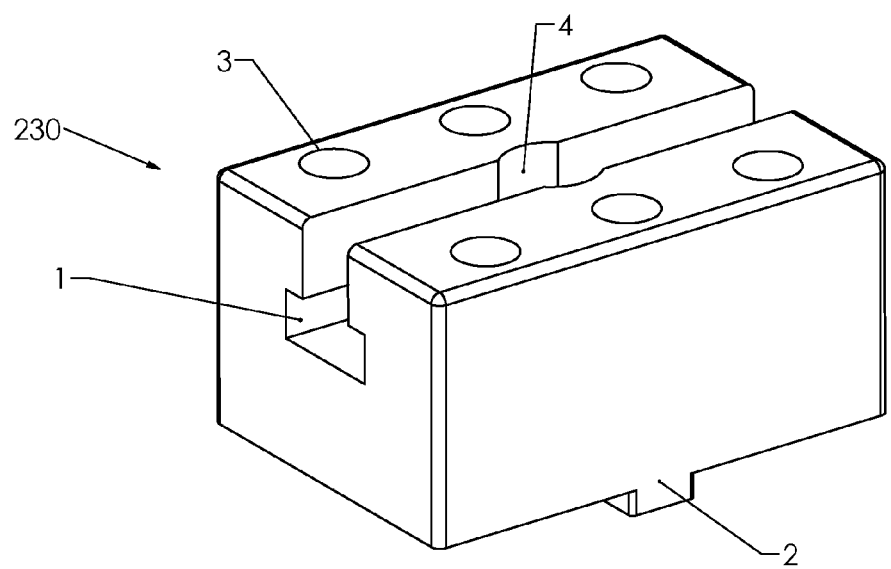
FIG. 4 shows another perspective view of an embodiment of the T-Slot Block, providing a shorter block.

FIG. 4 is a shortened T-Slot Block 230, having a T-slot 1, tab 2, tapped hole 3, and counter-bored passage 4 similar to the large T-Slot Block shown in FIG. 1 which may be adapted for use with smaller work pieces or where it is desirable to provide room on the milling table.

Figure 5:
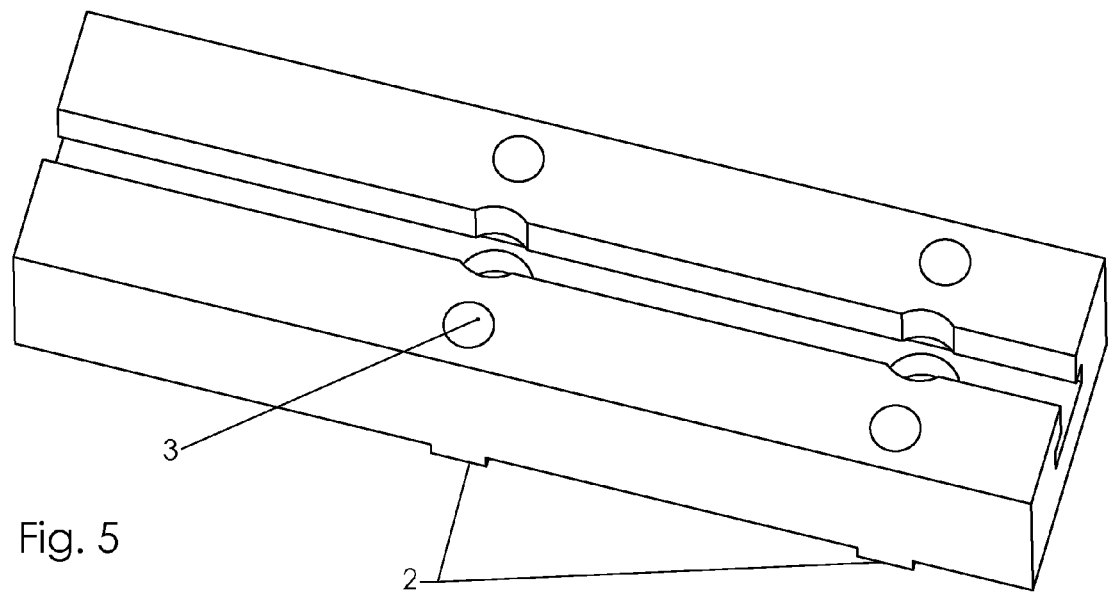
FIG. 5 shows a perspective view of another embodiment of the T-Slot Block, providing a longer block body and two locating tabs for spanning a milling table slot arrangement.

FIG. 5 is another embodiment showing a elongated T-Slot Block which provides tabs 2 for fitting into two adjoining slots on a milling machine's planar surface. This multiple tab arrangement provides substantial lateral stability resisting the side loading of the work piece experiences during the milling or machining operation.

As shown in FIGS. 1-5, T-Slot Blocks have four important features.

a. T-slot to accept T-slot tooling
   b. Tapped holes or threaded inserts
   c. A way to mount the T-Slot Block to the machine table
   d. T-slot location keys or tabs.

Figure 6:
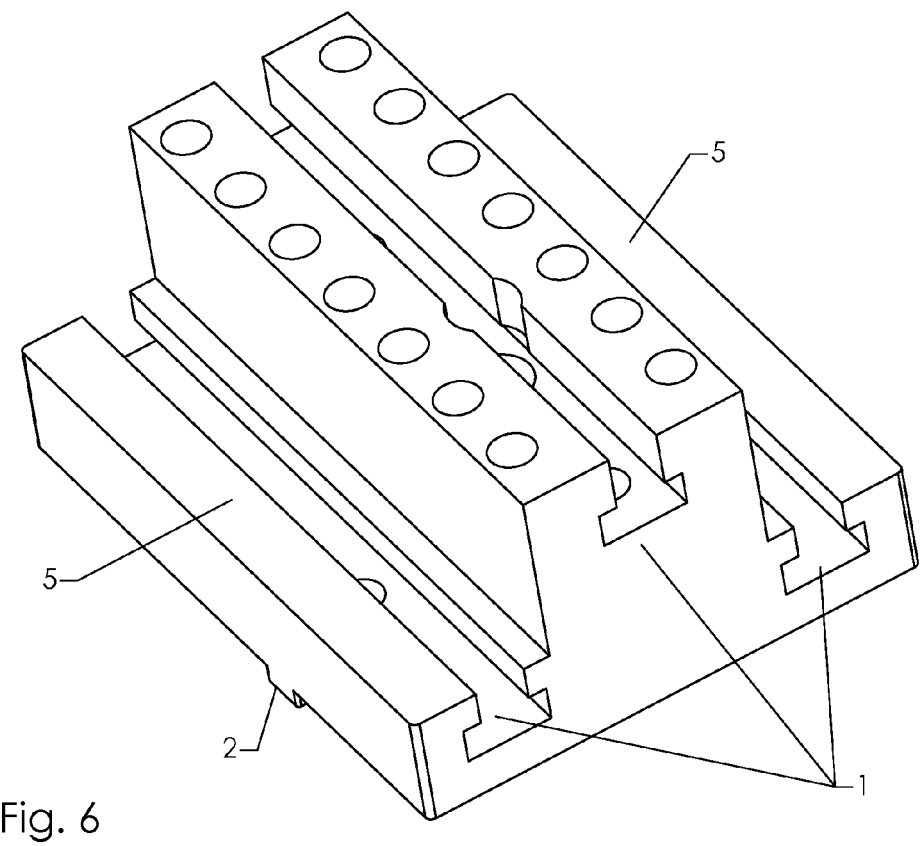
FIG. 6 is perspective view of a multi-tiered T-Slot Block providing multiple T-Slots, and multiple tapped holes.

In FIG. 6, another embodiment is shown which allows multiple configurations of T-slot arrangements to be quickly and easily formed on the milling machine surface. For example, as more clearly shown in FIGS. 16, 17, 18, and 19, the T-Slot Block can be combined to join other embodiments of the T-Slot Block to form useful and intricate work piece holders or clamping surfaces for holding or clamping the most difficult work piece securely. Since the different types of T-Slot Blocks can cooperate to provide varied rapidly deployable clamping surfaces, the machinist can readily devise a clamping arrangement to hold the work piece without substantial effort.

Figure 7:
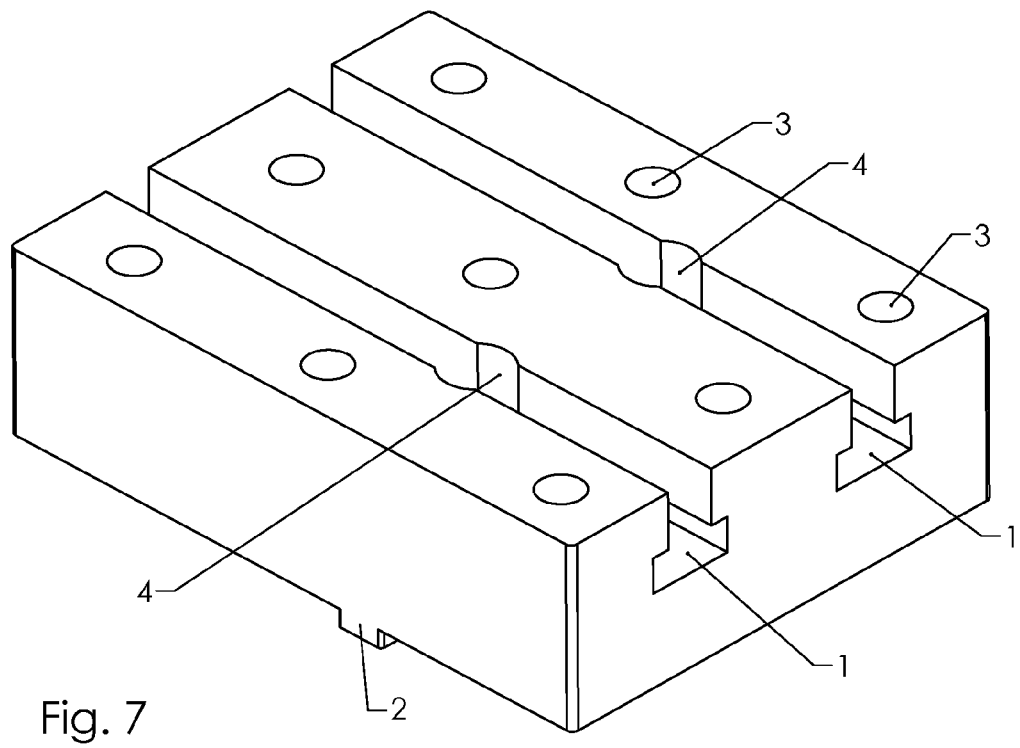
FIG. 7 is a perspective view of a wide T-Slot Block.

FIG. 7 provides a perspective view of an alternative embodiment of the T-Slot Block providing two adjacent T-slots 1 on an upper surface of an integral T-Slot Block, providing a plurality of tapped holes 3 and counter-bore passages 4, perpendicularly aligned with the planar surface slots of the milling machine by tab 2.

Figure 8:
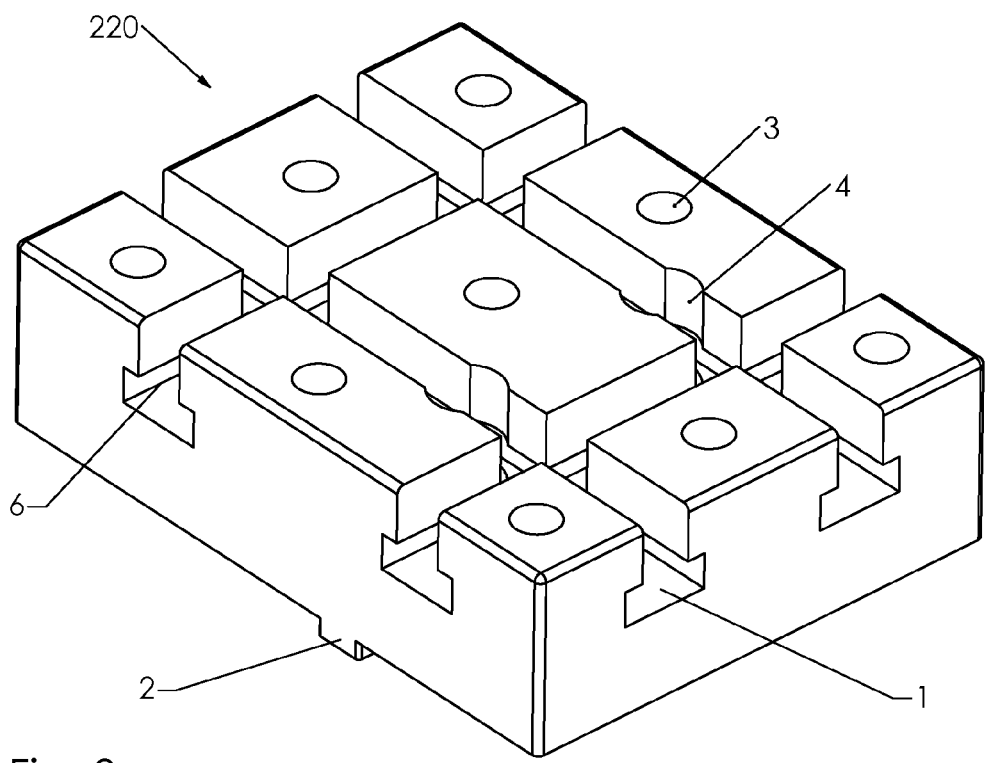
FIG. 8 is a top perspective view of a wide T-Slot Block, providing multiple T-Slots perpendicular to each other.

FIG. 8 is a perspective view of a variant of the embodiment shown in FIG. 7 showing perpendicularly aligned slots 6 intersecting slots 1, thereby running parallel to the planar surface slots of the milling machine into which tab 2 is placed.

Figure 9:
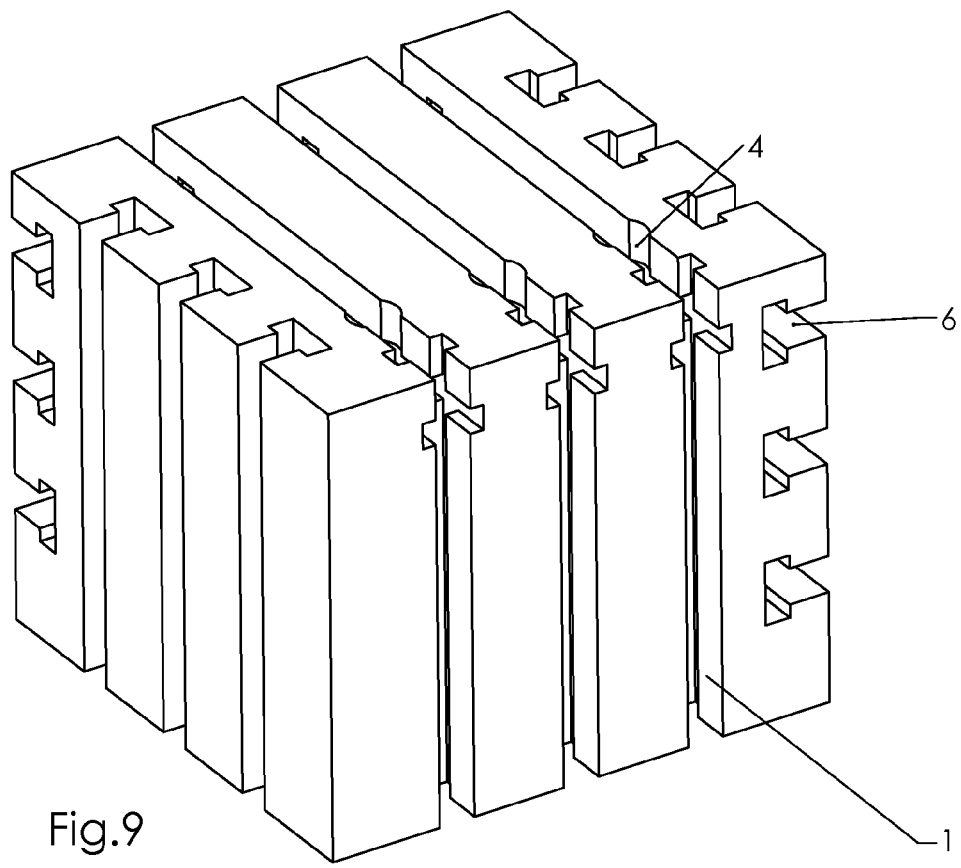
FIG. 9 is a perspective view of a large T-Slot Cube.

FIG. 9 is yet another embodiment of the T-Slot Block showing a block having a plurality of parallel T-slots on four of the six sides of the Block and also providing intersecting perpendicular slots 6 formed on one remaining side of the Block and slots running laterally on the fourth side of the Block, thereby permitting rapid set up of the work piece on the planar surface of the milling machine.

Figure 10:
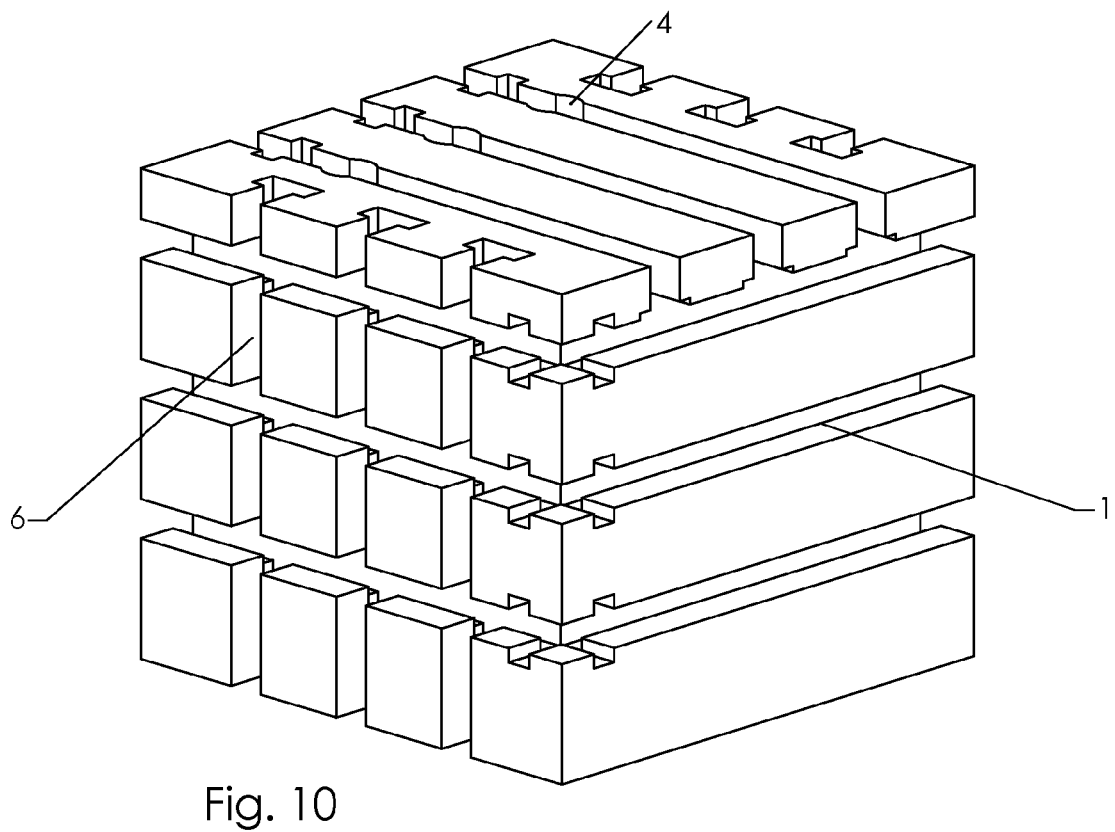
FIG. 10 is another side perspective view of the T-Slot Cube of FIG. 9.
Figure 11:
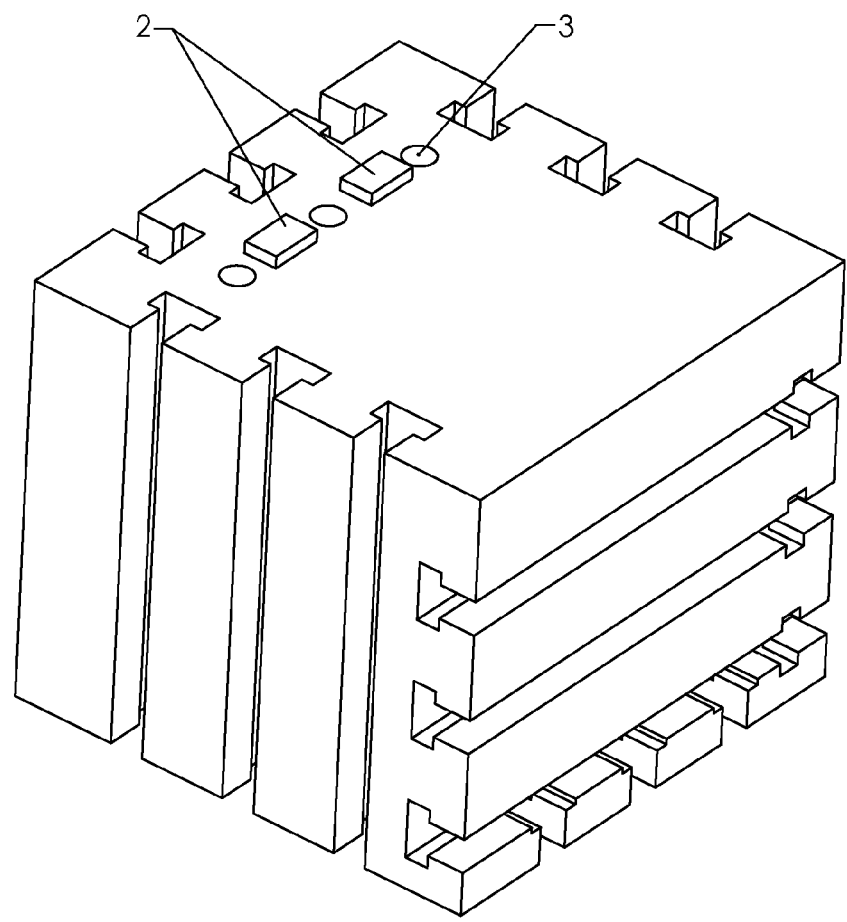
FIG. 11 shows the mounting side (a perspective bottom surface) of the T-Slot Cube.

FIG. 10 is the opposed side of the Block shown in FIG. 9 showing the intersecting perpendicular slots 1 and 6. FIG. 11 is a variant of the Block shown in FIGS. 9 and 10 also providing tabs 2 and tapped holes 3 for alignment of the Block on a planar surface of a milling machine.

Figure 12:
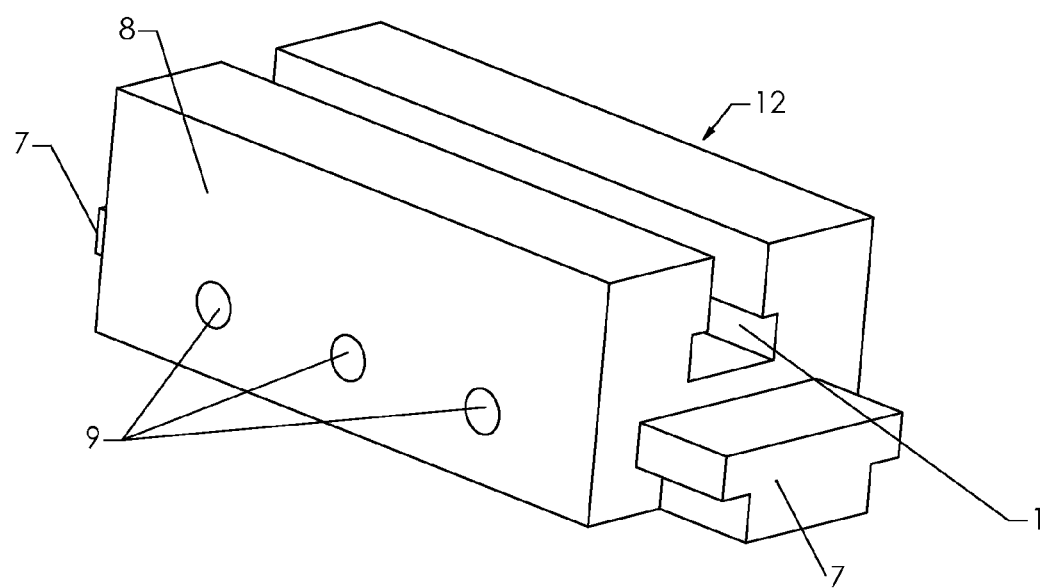
FIG. 12 is a perspective view of another embodiment of the present invention providing a Sliding T-Slot Block.
Figure 13:
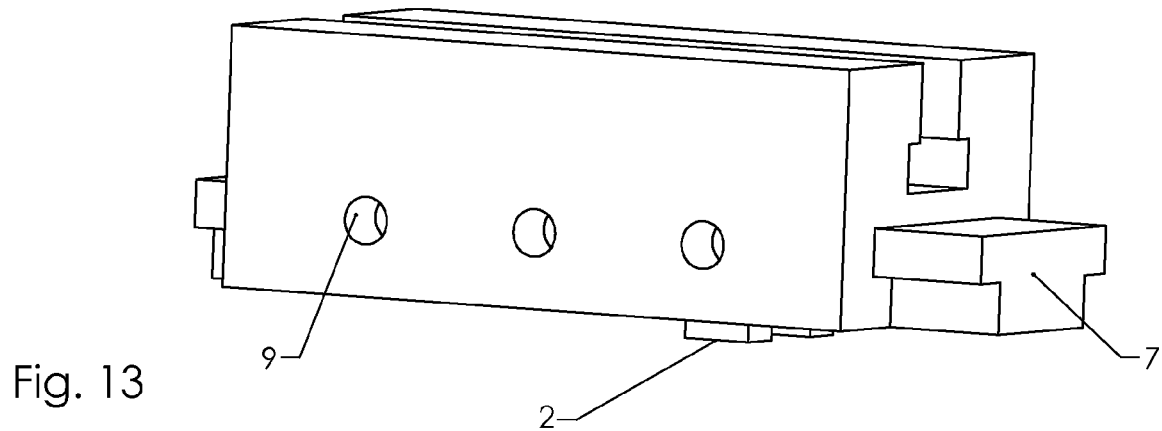
FIG. 13 is another perspective side view of the Sliding T-Slot Block assembly.
Figure 14:
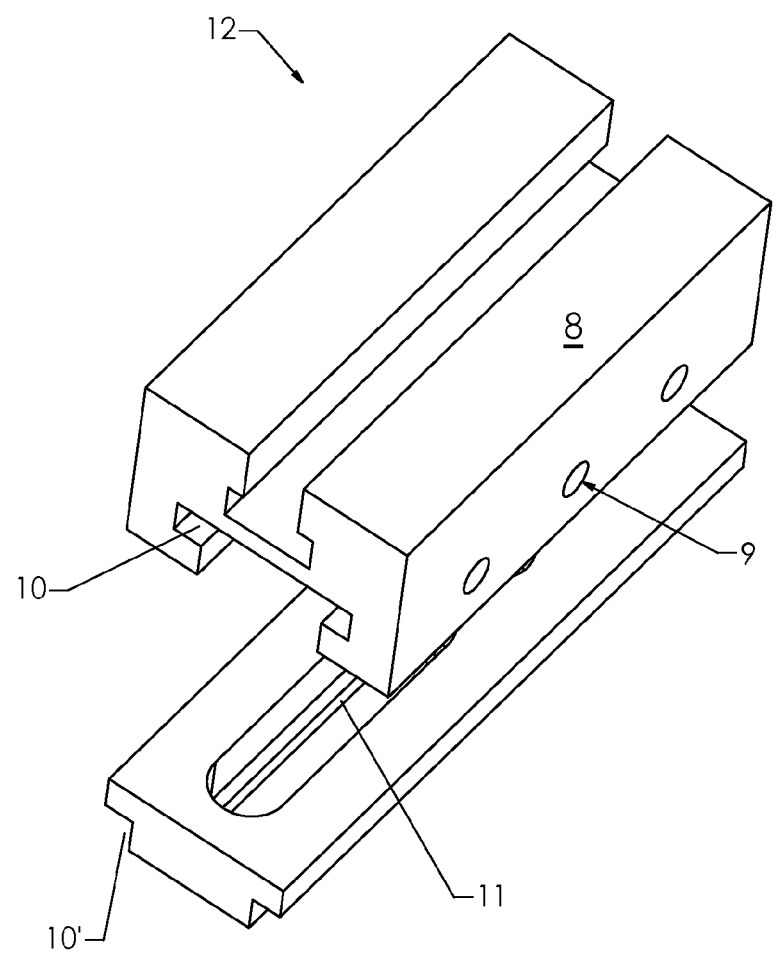
FIG. 14 is an exploded view of the Sliding T-Slot Block assembly.

In FIG. 12, an alternative embodiment 12 provides a lower base slide portion 7 of the sliding T-Block 8 that is attachable to the milling machine table in the normal manner wherein the sliding block 8 engages the T-slot 7 to permit an upper T-slot 1 on said Block 8 portion. The base 7 of the assembly bolts onto the machine tool's table in a conventional manner. Adjustable top T-Slot Block 8 is bolted through threaded holes 9 for clamping the top sliding T-Slot Block 8 onto the base 7. FIG. 13 is another perspective view of the embodiment shown in FIG. 12 showing the tab 2 which can be formed in the bottom surface of sliding block 7 of this embodiment. FIG. 14 is a top perspective view of the sliding block 12 assembly showing the counter-bored passage 11 used for affixing Slide 7, which provides the T-head 10A which engages the T-slot 10 of the T-Slot Block 8.

As more clearly shown in FIGS. 13 and 14, the Sliding T-Slot Block assembly permits attachment to the milling machine surface by tab 2 through counter-bore slot 11 formed in the T-Slide and the Sliding T-Slot Block to be thereafter assembled permitting a slot 10 that slides on the base 7 with a T shaped feature 10 that engages the slot. The counter-bored pocket 11 accommodates locking bolts that lock the T-slide to the planar work surface. This feature permits mounting on a variety of machine tool table sizes, since the mounting slots can vary from machine to machine.

Figure 15:
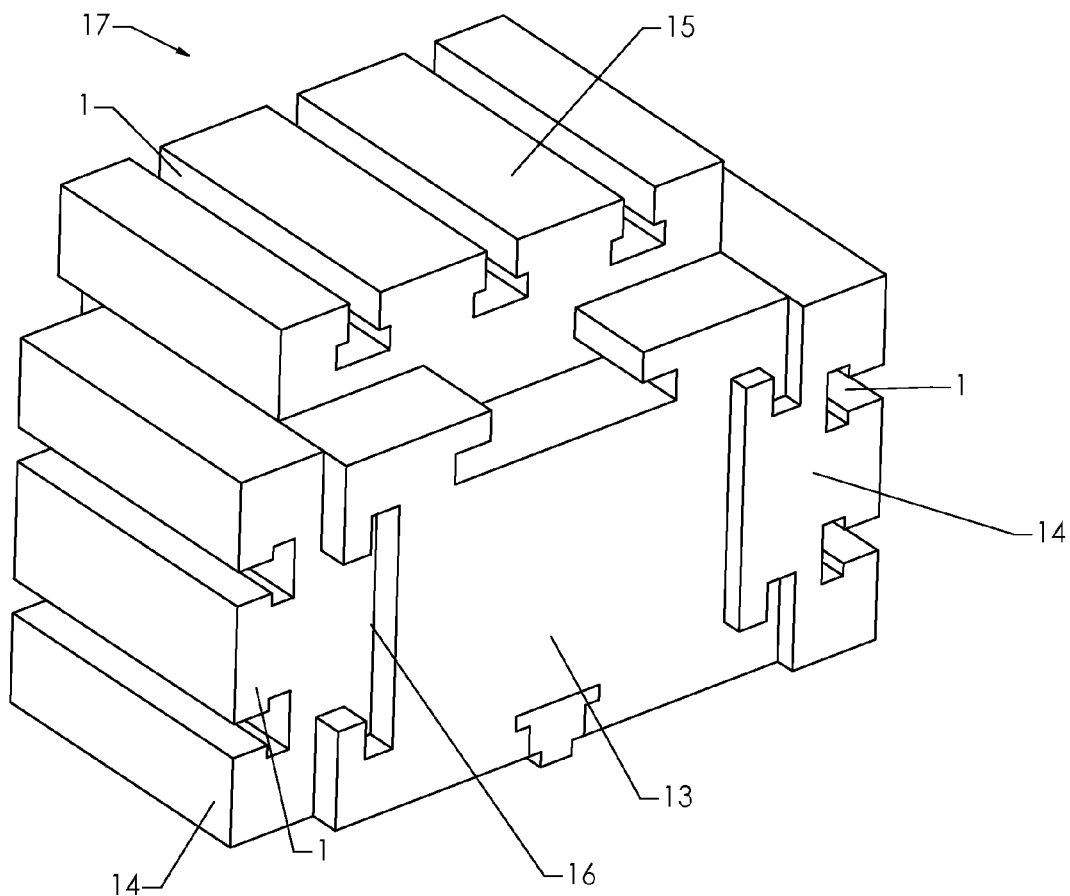
FIG. 15 is a composite perspective view of an assembly of separate cooperating components of T-Slot Blocks.

FIG. 15 shows a composite T-Slot Block assembly. A large base 13 mounts onto the machine tool's table. Base 13 provides T-slots that allow modular T-slots sections with to be positioned along the length of the base 13. Sliding component 14 mounts on each lateral edge of the large base 13. A wider modular section 15 with T-slots may be adapted to mount on the top surface of the T-Slot Block Assembly providing a plurality of mounting and clamping surfaces for use in manipulating the work piece during milling or machining operations. T-slot assemblies 14 and 15 can provide multiple T-slots and perpendicular T-slots.

Figure 16:
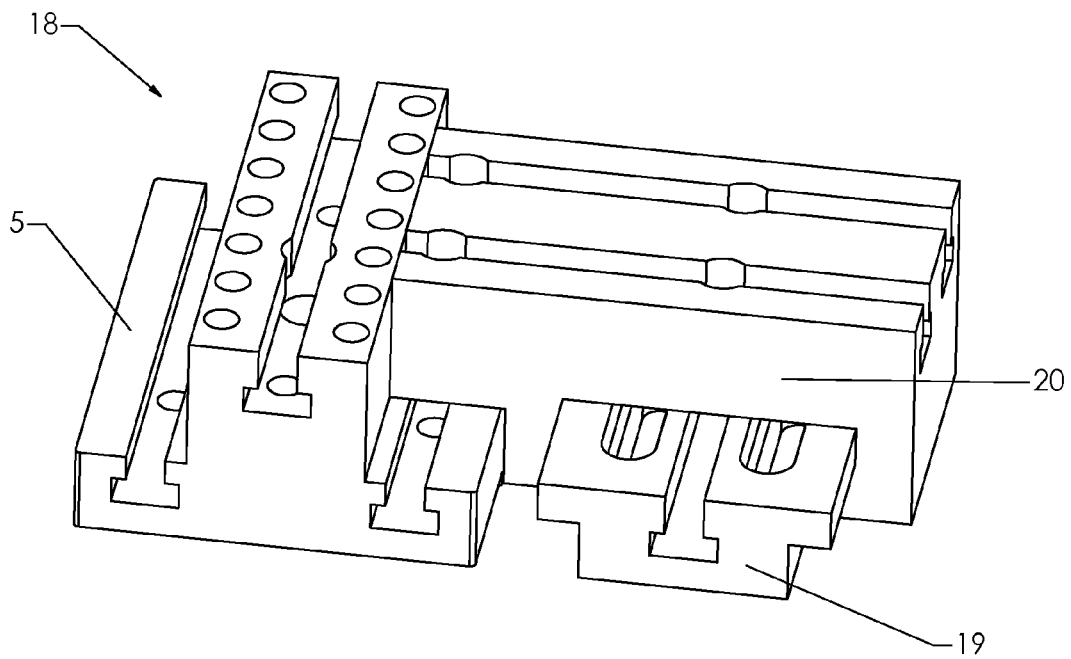
FIG. 16 is another perspective view of an arrangement of T-Slot Block assemblies for providing multiple clamping surfaces for a milling table.

In FIG. 16, an assembly 18 is fashioned from cooperating T-Slot Block components. An adjustable T-Slot Block 20, slides onto T-slot base 19. T-slot base 19 bolts onto the machine tool table. As noted in FIG. 16, this component is used to allow T-Slot Block 20 to be used in tandem with other T-Slot Block assemblies, so that T-Slot Block 20 can be bolted to the additional components, as the machinist may desire.

Figure 17:
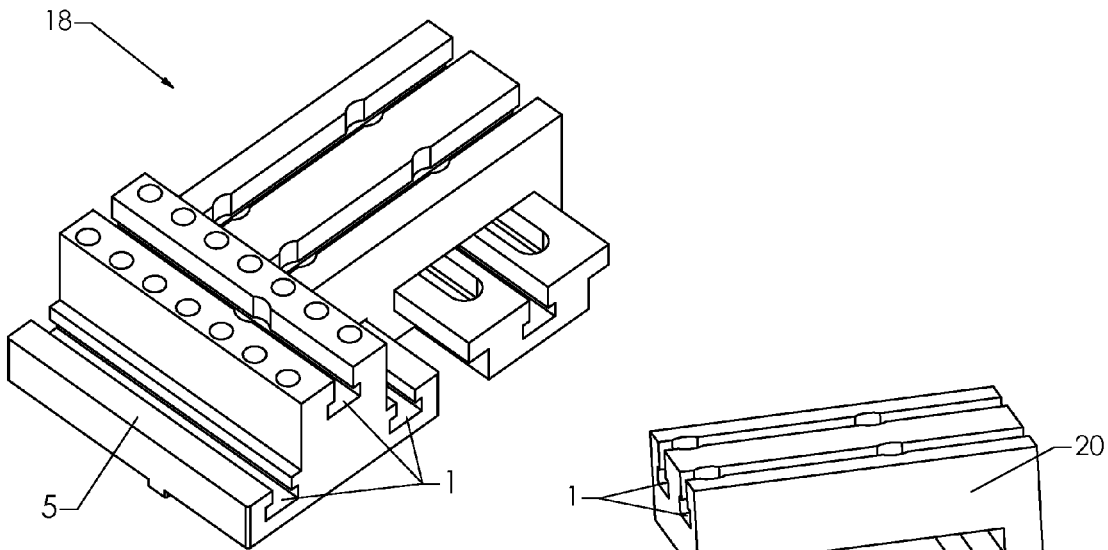
FIG. 17 is another perspective view of the composite assembly of T-Slot Blocks of FIG. 16.
Figure 18:
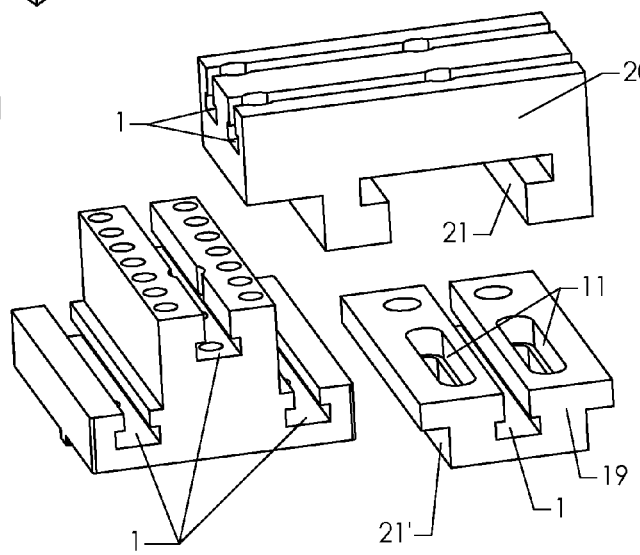
FIG. 18 is an exploded view of another embodiment of the T-Slot Block composite system of FIG. 16.
Figure 19:
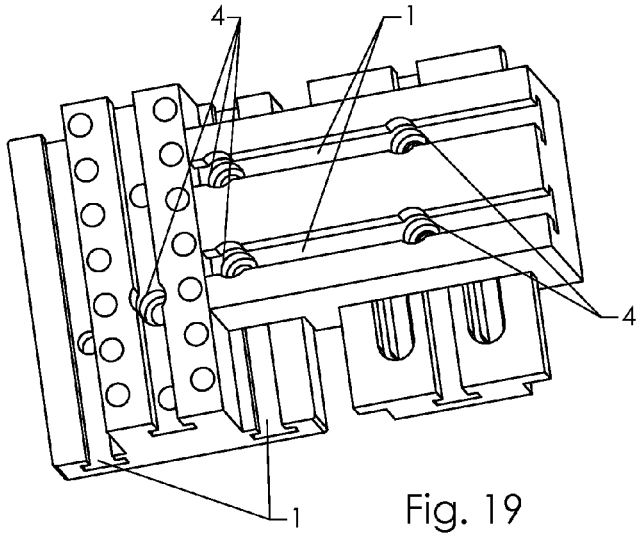
FIG. 19 is another top perspective view of FIG. 16.

In FIG. 17, T-slots 1 are formed in the upper surface of Slot Block 20 whereby Block 20 may be retained in a specific spaced relationship on T-slot Slide 19 by tongue 21A, which mates with cooperating grove 21. Counter-bored pockets 11 are formed in the Slide 19 to retain the slide in fixed position on the milling machine planar table. FIGS. 18 and 19 show various views of the assembly shown in FIG. 17. FIG. 18 showing an exploded view of FIG. 17 also shows an alternative counter-bores 11 formed in each edge of the T-Slot Block base 19.

The T-Slot Block is a work-holding product making precision machine jobs faster and easier. The T-Slot Block is a versatile system for work-holding having many important features and advantages, such as industry standard T-Slots, and threaded holes for corresponding T-nut studs or bolts.

T-slots and threaded holes are designed into each T-Slot Block. This allows the user to employ existing in-house T-slot tooling, such as T-nuts, studs, clamps, straps, and the like. T-Slot Blocks are modular in nature, and can be used as dedicated fixture plates, or for dedicated setup stations. The T-Slot Block also aids the placement of T-nuts or studs or bolts anywhere they are needed on the machine table. The T-Slot Blocks offer numerous clamping possibilities and strategies which were difficult and expensive to pursue using modular fixturing kits or pallets from various companies; for example, Te-Co, Inc. of Union, Ohio, Jergens, Inc. of Cleveland, Ohio, Can Lane Manufacturing Co. of St. Louis, Mo., Fixtureworks, Inc. of Fraser, Mich. Although most of these "Fixturing Kits" allow the use of T-slot tooling, the T-Slot Blocks are different from the so-called "Fixturing Kits" since a machinist no longer needs to utilize expensive mounting plates, locating keys, or other mounting peripherals. A machinist simply mounts the T-Slot Block onto an existing mill table and configures the job as needed.

The previous examples of the T-Slot Blocks, such as shown in FIGS. 1-5 can be color coded to aid rapid setups. Blue colored T-Slot Blocks for one T-Slot, Red colored for two T-Slots, and can be provided in either in parallel or perpendicular slot arrangements. A black colored T-Slot Block (not shown) can also be provided, which is a T-Slot Blank. The blank T-Slot Block provides nothing more than a planar surface which can be fit in a T-slot table on a machine shop table. Other colored miscellaneous T-slot holding blocks not shown include a green colored T-Slot Blocks designed like a strap, providing T-Slots, but does not have tabs. Color-coding is useful for allocating T-Slot Blocks, quickly identifying what type of blocks are deployed on the machine table and what additional types may be needed. Also, color-coding can be useful for instructional purposes, for repeat jobs, or for aiding new or different workers in preparing for new or repeat work.

A sampling of ways in which T-Slot Blocks can be used as work-holding devices, setup stations and more are illustrated by the following drawings, which describe the wide variety of uses for which this invention may be utilized.

Figure 20:
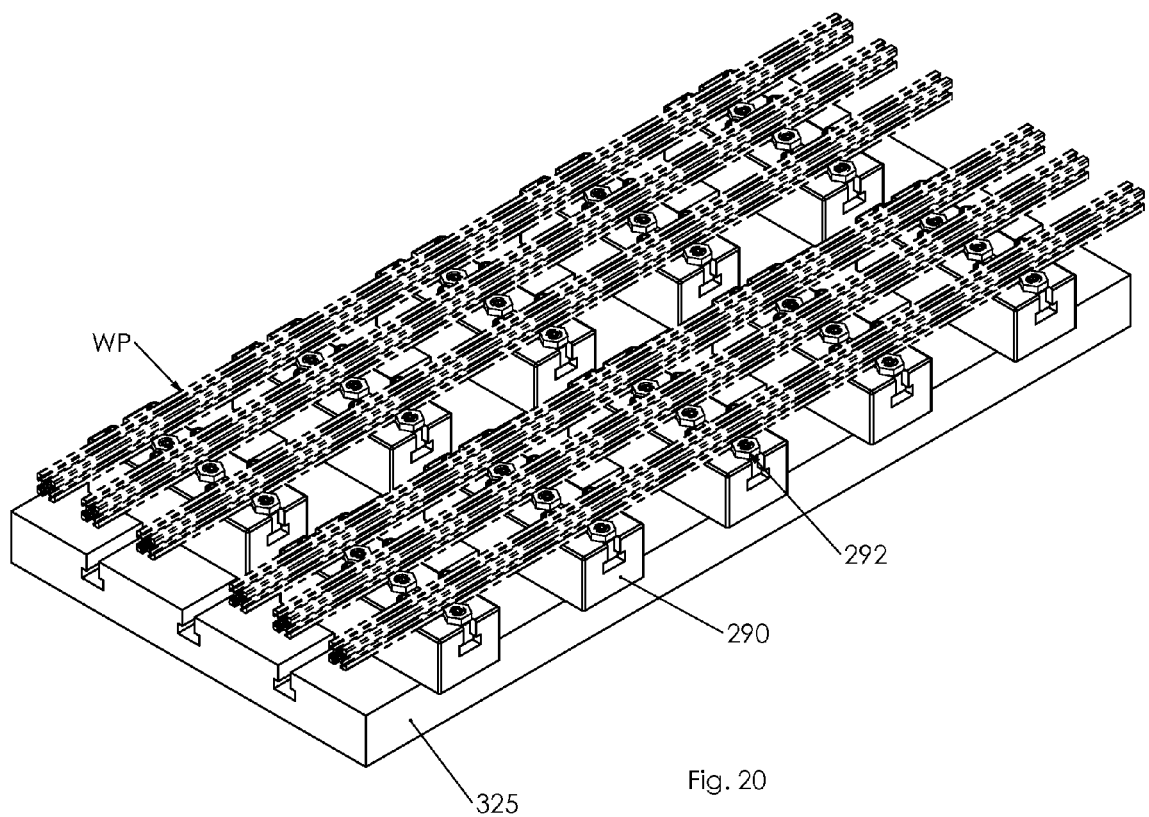
FIG. 20 is top perspective view of an example showing the T-Slot Block arrangement for holding long and narrow work piece parts.

In FIG. 20, T-Slot Blocks 290 are being used to hold multiple extruded aluminum frames. The machine table 325 shown in FIG. 20 is a small 34×16 size table. The extruded aluminum is 20 mm×20 mm×762 mm. On the T-Slot Block, work stops 292, and clamps 292 are pre-positioned. The machinist can remove the work pieces and the T-Slot Block can then be removed from the machine table and stored for repeat work. Set up is fast and all the mini clamps and stops can remain on the T-Slot Block. The T-Slot Block can be used as a dedicated work fixture.

Figure 21:
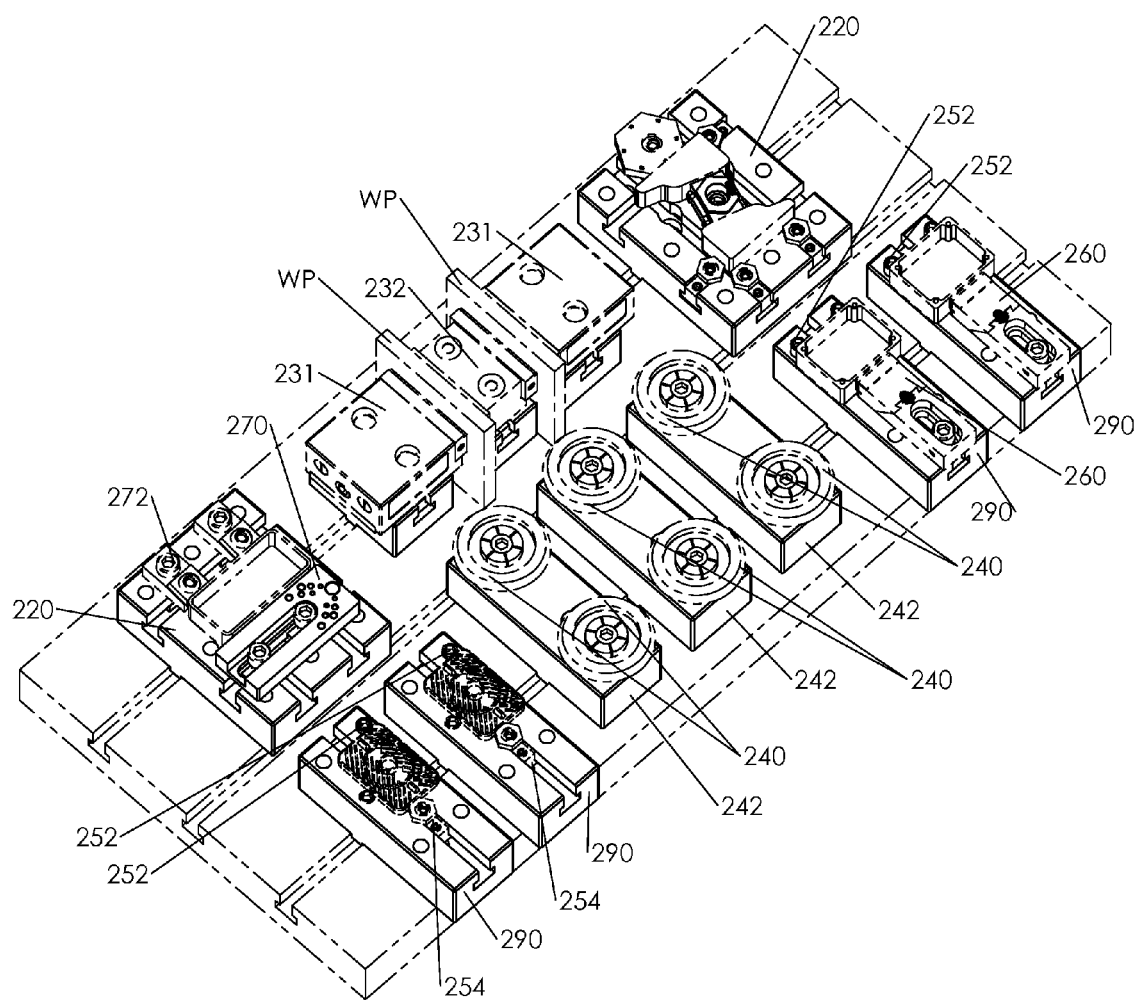
FIG. 21 is a top perspective view of another example showing different types of T-Slot Blocks holding various work pieces.

In the following illustrative set up, various T-Slot Blocks are used for holding various parts. Also, common off-the-shelf edge clamps, work stops and other work holding items are also employed. FIG. 21 shows, various T-Slot Blocks are used to hold work pieces. The machine table shown is a small size table. The work pieces vary in size and shape. On the T-Slot Blocks, work stops, and clamps or even mini vises are used and can be retained on the mini T-Slot Block for rapid deployment.

Figure 22:
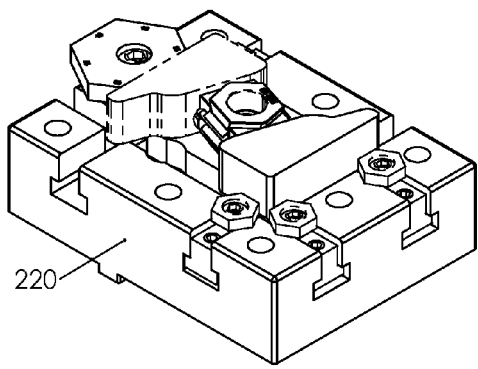
FIGS. 22, 23, 24, 25, 26, and 27 are perspective close-up views of elements of FIG. 21

Shown in FIG. 22, the T-Slot Block T2P2 220 provides a T-Slot Block that has two slots and two perpendicular slots. FIG. 22 shows the T2P2 220 with clamps and a positioned work piece. The T2P2 T-Slot Block is setup as a dedicated fixture base. A machinist could bolt the T2P2 220 onto the mill table with all the clamps preset, providing an efficient method for repeat jobs.

Figure 23:
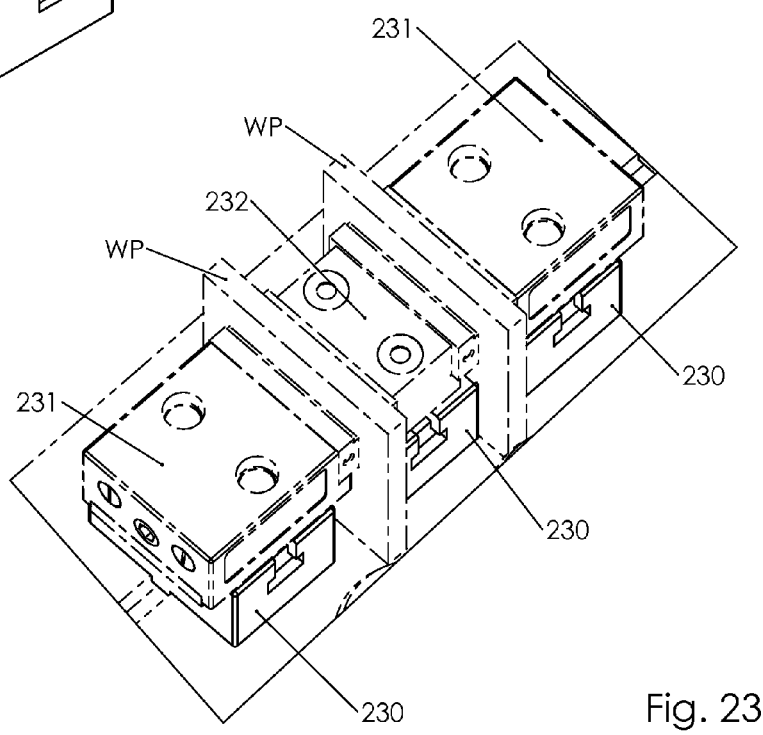

FIG. 23 is a close up a portion of FIG. 21. The T-Slot Block Minis 230 are used to hold vise components. The work pieces WP are tall plates that must be milled and taped on the edges. Set up is fast and easy, and can be accomplished in the following manner: insert or install the T-Slot Block Minis 230; insert or install the vise components 231; if the vise components have location keys 232, use them on the T-Slot Block; bolt the vise components onto the T-Slot Block using T-nuts. A machinist is then ready to begin machine work. In FIG. 23, tall plates WP are positioned so that mill work can be done on the edges. Using a conventional vise for this sort of work may not be suitable. In a conventional vise, the unsupported area of the work piece may vibrate and flex during machining.

Figure 24:
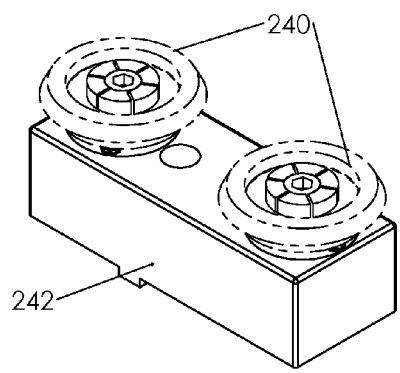

FIG. 24 shows how the T-Slot Block Blank (not previously shown) can be used to fabricate a special purpose work holding example as illustrated in FIG. 9. Pockets were milled into the Blank. The pocket was then tapped to allow the use of two ID clamps 240. The ID clamps 240 are bolted into the T-Slot Block Blank 242. Then the part to be machined is added and clamped. This work holding setup can be used again and again. Once the millwork is done, leave the ID Clamps in place on the T-Slot Block Blank and just remove the T-Slot Block Blank 242 from the mill table, and store for repeat work. This type of use of the T-Slot Block Blank 242 is a simple, yet powerful tool. The machinist user decides what clamps to use and where and then mills the placement for those work-holding tools in the T-Slot Block Blank 242. The ID Clamps 240 shown here are offered as an example of the many ways in which the T-Slot Block Blank can be used. Of course other work-holding tools can be used in this manner: edge clamps, T-slot tooling, vise components, etc. can all be used with this new device.

Figure 25:
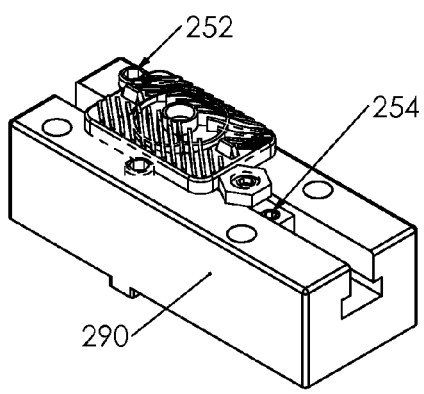

As shown in FIG. 25, the standard T-Slot Block 290 is used to hold an injection molded part for a tapping operation. Work stops 252 consist of ½-13 inch cap-head set screws. The clamp 254 is a readily available common T-nut type edge clamp. Setting up T-Slot Blocks 290 is quick, requiring only installation of set-screws and positioning the T-nut edge clamp.

Figure 26:
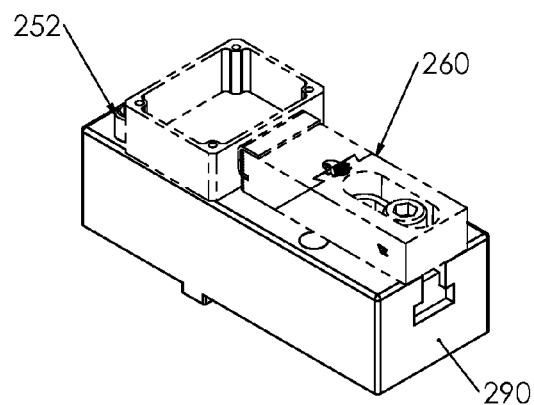

The standard T-Slot Block 290 can be adapted for use in a variety of work-holding set ups. As shown in FIG. 26, for example, set-screws 252 again serve as work stops, and another common off-the-shelf edge clamp 260, different from the T-nut type edge clamp 254 shown above in FIG. 25, is used to secure the part.

Figure 27:
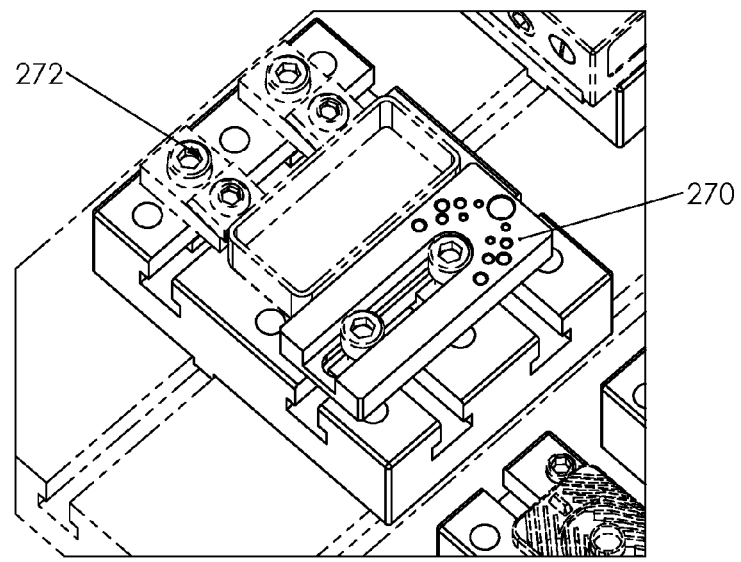

The T2P2 style T-Slot Block 220 is used to hold this work piece, as shown in FIG. 27, an enlargement of a portion of FIG. 21. The work piece WP is a plastic electronic instrument enclosure. Cut outs for buttons and switches must be milled. Work stops can consist of whatever a shop has handy. In this case, a strap 270 is used. Clamping is done by inexpensive edge clamps 272. One would choose to set up the work piece WP using these parts when a regular vise is unavailable or for a particular operation when the work piece WP is thin and fragile and the work piece part must be supported from the bottom. To accomplish this in a conventional vise would require machining custom soft jaws, or using custom supports to hold the part. With the T-Slot Block 220, a machinist user would simply lay the part down on the T-Slot Block. Since the T-Slot Block has T-slots attaching clamps can be easily completed. The fragile work piece WP is thus supported, and if necessary high density work holding (ie. multiple identical pieces) can be done in this manner. For high density work holding or multiple work holding, the T2P2 style T-Slot Block 220 can be loaded or configured off of the machine table, possibly while the CNC Mill is working. Then, the T2P2 style T-Slot Block can be clustered all over the CNC Mill table.

Figure 28:
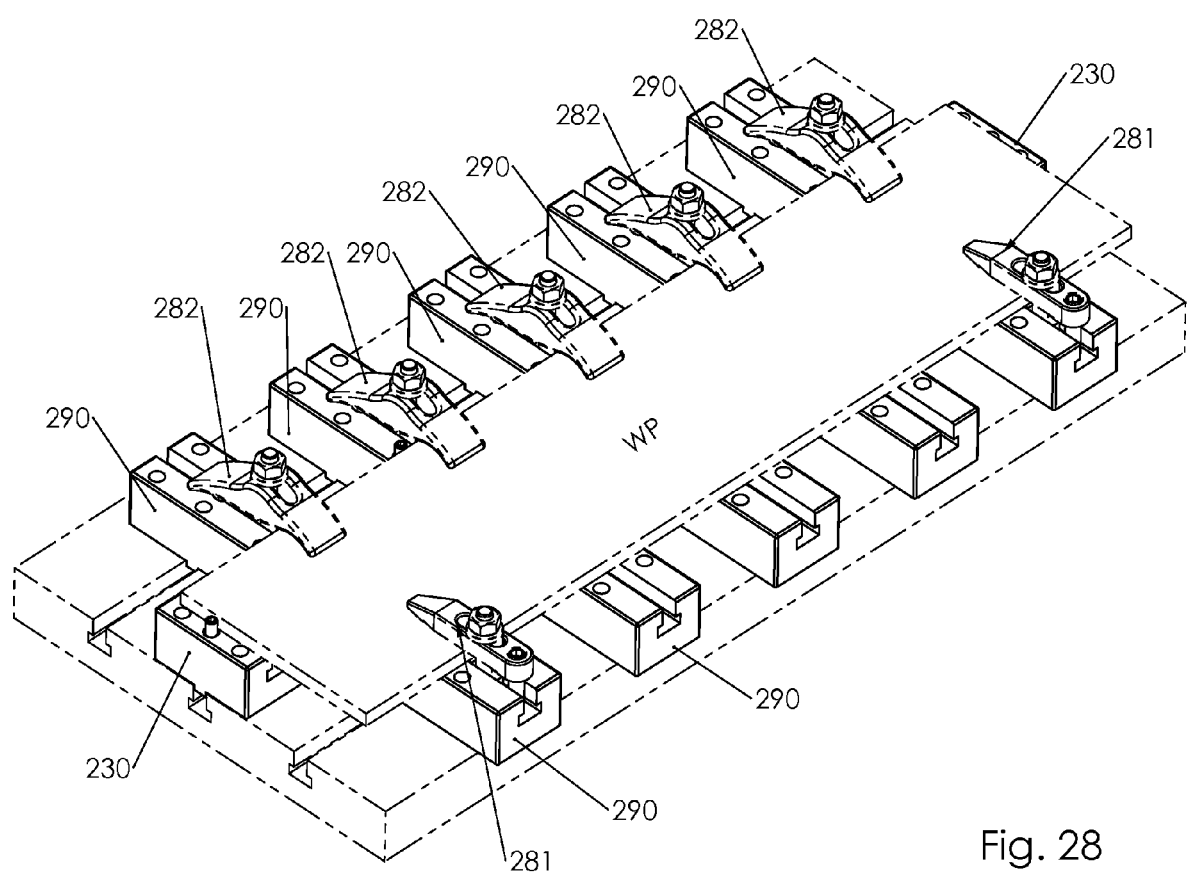
FIG. 28 is a top perspective view of another work holding example of the T-Slot Blocks

As shown in FIG. 28, a large steel plate WP is to be machined. A 45° chamfer must be milled on the edge of the part. The steel plate measures 8"×30"×½". The steel plate is too large for most vises. Only large and heavy vises could hold this and milling a chamfer on the edge can also be challenging with a single vise.

At a fraction of the cost of two heavy vises, ten T-Slot Blocks 290 and two T-Slot Block minis 230 are used. The clamping consists of five medium sized strap clamps 282, and two small strap clamps 281. The two T-Slot Block minis 230 serve as edge reference placement for the steel plate WP. In this scenario, the chamfer cutting tool (not shown) can reach most of the edge of the steel plate WP. One way to mill the chamfer is to mill the central edge. Then without moving the steel plate, simply relocate the two small forged clamps 281.

Working with large pieces is something that most vises cannot readily handle and the cost of using fixture plates and all the required tooling that is associated with that operation is very expensive. Most of the tooling for the fixture plates works only with the plates in the kit.

The T-Slot Blocks are designed to work with common T-Slot tooling, and in some cases can work with fixture plates and/or fixture tooling. If a shop has common T-Slot tooling and they find themselves needing more work-holding options but don't like the idea of investing in fixture plates and fixture tooling due to the high cost, then the T-Slot Block solution fits that need. T-Slot Blocks require a much smaller original investment, and since they are compatible with existing work holding tooling, they minimize investment in new tooling.

Figure 29:
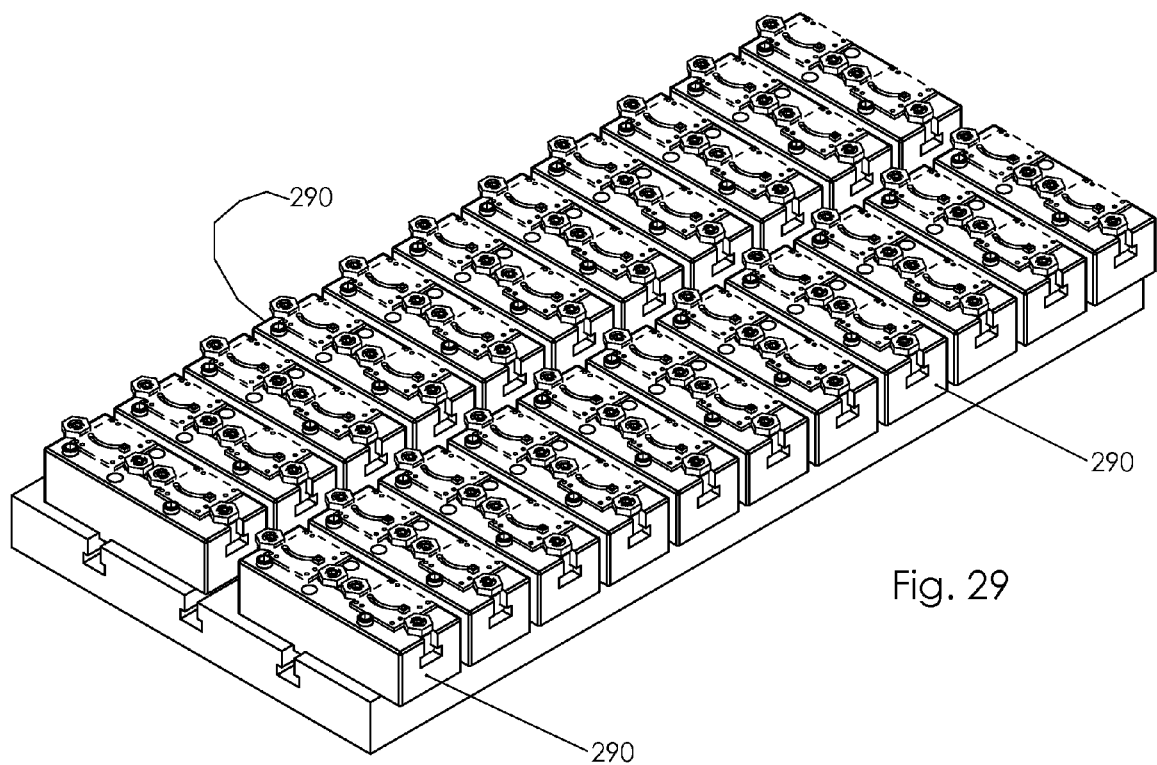
FIG. 29 is a top perspective view of high density work holding example for the T-Slot Blocks
Figure 30:
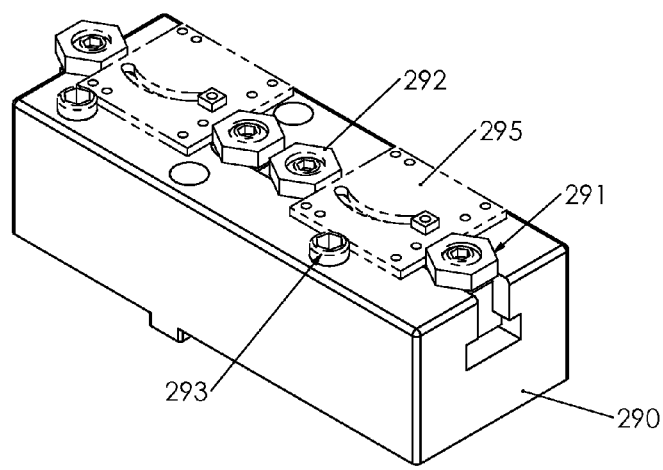
FIG. 30 is a top perspective view of a close up view of an element of FIG. 29.

For high-density work-holding, the T-Slot Blocks easily offer many possibilities. As shown in FIG. 29, T-Slot Blocks 290 can be arranged in a cluster. As shown in FIG. 29, there are twenty-two T-Slot Blocks 290, each of which can hold two work pieces, as more clearly shown in FIG. 30, is a close up view of one of the T-Slot Blocks 290 on FIG. 29. This permits forty-four parts 295 to be machined with one setting. In this close up view of FIG. 29, as shown in FIG. 30 the components of the cluster arrangement consists of the T-Slot Block 290, two edge clamps 291 and 292, one for a work stop and one for clamping. A set-screw 293 to act as a reference edge, for one work piece 295. As previously noted, the T-Slot Blocks can handle two sets or two work pieces depending on their size. Additionally, if this type of high-density job is often repeated, all of the clamping components can remain on the T-Slot Block and the T-Slot Block can be stored for future work. Installing on the machine tool table is thereby made very fast. Custom fixture plates are not needed. Expensive cluster vises are not needed. To get this many parts on the machine table one would need very expensive and possibly custom made vises, the cost of which would far exceed the twenty-two T-Slot Blocks shown in FIG. 29. With its varied work holding capability, the T-Slot Blocks are well suited for this type of work holding. In the example shown above in FIG. 29, the T-Slot Blocks substitute for a giant fixture plate, providing T-slots, tapped holes, and easy mounting to the machine tool table. In fact, the T-Slot Blocks can replace the acorn-type fixture plate. Modular and utilitarian, the T-Slot Blocks offer more ways to adapt to work pieces and common off the shelf T-slot tooling, clamps, bolts, straps and etc. can be used.

These are just for milling machine applications. Welding, assembling, and other forms of manufacturing can also benefit from the T-Slot Block and nothing contained in this extended description of these arrangements of the T-Slot Blocks shown herein are intended to limit or scope of this disclosure.

As may be readily appreciated, the use of various combinations of the foregoing T-Slot Blocks and assemblies permits the machinist to lock down or clamp the work piece in a variety of differing and difficult positions. The flexibility of this selection of T-Slot Block assemblies has previously always required the ingenuity of the machinist to devise a means of holding an unwieldy or oddly shaped work piece. The present invention takes all the difficulty out of such decisions thereby allowing the machinist to complete complicated milling or machining jobs in a minimum of time. The T-Slot Blocks are sturdy enough to be used over and over again and various new arrangements may suggest themselves to those having need of these devices.

The foregoing disclosure and description of the invention is illustrative and explanatory thereof and it can be readily appreciated by those skilled in the art that various changes in the size, shape and materials, as well as in the details of the illustrated construction or combinations of the elements described herein may be made without departing from the spirit of the invention.

What is claimed is:

1. An apparatus for clamping a work piece to a milling table providing a plurality of grooves to rigidly hold the work piece for machining comprising:
    a body having at least one integral milling table groove-engaging tab for insertion in the milling table;
    one or more T-shaped grooves formed in a second surface of said body; and,
    at least one passage having a notched opening formed in said body with at least one aperture formed through the body permitting affixation of the body to the milling table.

2. The apparatus of claim 1 further providing a second body attached to one or more of said T-shaped grooves, said second body providing one or more additional T-slot grooves and a passage formed in said second body accommodating a head of an attachment screw permitting affixation of said second body to the body.

3. The apparatus of claim 1 wherein the one or more T-shaped groove formed in the surface of the body are perpendicular to the grooves of the table.

4. The apparatus of claim 1 wherein the one or more T-shaped groove formed in the surface of the body is acutely angled to the grooves of the table.

5. The apparatus of claim 1 wherein the tab in the surface of the body is acutely angled to the grooves of the table.

6. The apparatus of claim 1 wherein the tab in the surface of the body is perpendicular to the grooves of the table.

7. The apparatus of claim 1 wherein the tab in the surface of the body is parallel to the grooves of the table.

8. The apparatus of claim 1 wherein an upper surface of the body is planar and a lateral edge provides one or more T-slot grooves.

9. The apparatus of claim 1 wherein the body is color-coded.

10. The apparatus of claim 1 wherein the body slideably engages a T-slide assembly.

11. A method for clamping a work piece to a machining table comprising:
    inserting a first body providing an integral tab to restrain said first body from lateral movement on a surface in a machining table slot and provide one or more T-slots on a second surface of said first body to affix at least one cooperating work piece to said first body;
    affixing said first body to the machining table by inserting a fastener in a passage through said first body and machining table to restrain the first body; and,
    affixing a cooperating work piece on a surface of said first body and at least one fastener to restrain the work piece from movement on said first body.

* * * * *